(12) United States Patent
Cruise et al.

(10) Patent No.: US 9,281,695 B2
(45) Date of Patent: Mar. 8, 2016

(54) BATTERY PACK CHARGERS AND CHARGING METHOD

(75) Inventors: Nathan J. Cruise, Phoenix, MD (US); Michelle L. Bowers, Westminster, MD (US); Snehal S. Choksi, Owings Mills, MD (US); Regina Gracia C. Cunanan, Parkville, MD (US); Geoffrey S. Howard, Columbia, MD (US); Alexis W. Johnson, Warren, PA (US); Andrew E. Seman, White Marsh, MD (US); Danh T. Trinh, Parkville, MD (US); Daniel J. White, Baltimore, MD (US); R. Roby Bailey, Jr., New Park, PA (US)

(73) Assignee: Black & Decker Inc., Newark, DE (US)

( * ) Notice: Subject to any disclaimer, the term of this patent is extended or adjusted under 35 U.S.C. 154(b) by 2365 days.

(21) Appl. No.: 12/213,060

(22) Filed: Jun. 13, 2008

(65) Prior Publication Data
US 2008/0315834 A1    Dec. 25, 2008

Related U.S. Application Data

(60) Provisional application No. 60/945,187, filed on Jun. 20, 2007, provisional application No. 60/949,603, filed on Jul. 13, 2007.

(51) Int. Cl.
*H02J 7/00* (2006.01)

(52) U.S. Cl.
CPC ............ *H02J 7/0006* (2013.01); *H02J 7/0008* (2013.01)

(58) Field of Classification Search
USPC .................................. 320/106, 110, 162–164
See application file for complete search history.

(56) References Cited

U.S. PATENT DOCUMENTS

| 5,485,090 A * | 1/1996 | Stephens ........................ 324/433 |
| 5,627,449 A * | 5/1997 | Fujiki ............................ 320/106 |
| 5,787,018 A * | 7/1998 | Bolan et al. ...................... 702/33 |
| 6,252,373 B1 * | 6/2001 | Stefansson et al. ........... 320/106 |
| 6,456,037 B1 * | 9/2002 | Jakl et al. ....................... 320/106 |
| 6,931,332 B2 * | 8/2005 | Phansalkar et al. ............. 702/63 |
| 2006/0087286 A1 * | 4/2006 | Phillips et al. ................ 320/114 |

* cited by examiner

*Primary Examiner* — Daniel Miller
(74) *Attorney, Agent, or Firm* — Michael Aronoff

(57) ABSTRACT

A method of charging a battery pack is provided. The method includes: electronically connecting a battery pack to a charger; detecting information regarding the battery pack; determining an appropriate charging regime based on the detected information; and applying the charging regime to the battery pack. A battery charger may also provided. The battery charger includes: a first terminal for connecting to a battery pack; a second terminal for connecting to a battery pack, a microprocessor operatively connected to the terminals and configured to receive a signal from at least one terminal regarding a battery pack connected to the terminal and control the charger to select and apply a charging regime to the battery pack according to the signal.

7 Claims, 9 Drawing Sheets

BATTERY PACK CHARGERS AND CHARGING METHOD

CROSS-REFERENCE TO RELATED APPLICATIONS

This application claims priority to U.S. provisional patent applications: 60/945,187, titled "Battery Pack Charger" filed Jun. 20, 2007 and 60/949,603, titled "Battery Pack Chargers and Charging Methods" filed Jul. 13, 2007 the disclosures of which are hereby incorporated by reference in their entirety.

BACKGROUND

1. Field

Example embodiments relate in general to charging devices and methods for charging and/or recharging battery packs, for example, power tool battery packs having a variety of chemistries and plug configurations.

2. Description of Related Art

Portable power tools may rely on battery packs to supply power when used in remote or otherwise inaccessible areas. Battery packs for power tools may have a compact design to decrease overall tool size and bulk and may have higher energy storage capacity to facilitate longer remote tool use/discharge times. To achieve higher power, energy storage, and recharging capacity with minimum size and weight, conventional battery packs may include Lithium-Ion (Li-Ion), Nickel-hydroxide/Cadmium (NiCad), and Nickel/Metal hydride (NiMH) chemistries. Battery packs may include a variety of other unique physical characteristics and shapes based upon their intended use.

Similarly, conventional battery pack chargers exist to recharge specific types of batteries with varying configurations based on the battery-based application. Conventional battery pack chargers are generally configured to be compatible with specific conventional battery packs, which, as stated above, have varying physical characteristics based upon their application. Conventional battery pack chargers may charge only battery packs with specific physical shape, chemistry, adaptor configuration, electronics, and/or other battery pack characteristics. Conventional battery pack chargers may not charge or may improperly charge battery packs not meeting the specific criteria required for the individual charger.

Accordingly, conventional battery pack chargers typically have features matching a specific battery pack to be charged and are incompatible with batteries not having these specific characteristics, in order to both reduce cost and complexity. The chargers may include only components capable of charging a specific battery pack; for example, chargers may be capable of providing a single electrical current type corresponding to the single type of battery intended to be used in the charger. Further, conventional battery packs may properly interact with only a single type of battery; for example, chargers may be capable of determining charge/recharge completion in only a single predetermined type of battery.

Because conventional battery pack chargers are designed to charge a single type of battery, undesirable results may occur if inappropriate battery types are electrically connected to conventional chargers. Thus conventional battery pack chargers often include mechanisms to determine if the connected battery is an appropriate type. If the battery pack does not have the specific set of appropriate characteristics, conventional battery chargers may not charge or otherwise interact with the inappropriate battery.

Similar lockout mechanism for incompatible chargers and batteries may be used with power tools, where multiple batteries are used with multiple remote tools; however, it may also be difficult to match multiple batteries having an exact set of appropriate characteristics with the proper conventional battery pack chargers.

SUMMARY

Example embodiments may include battery pack chargers and methods capable of charging battery packs with varying physical characteristics and chemistries, including Li-Ion batteries with higher charge/weight ratios. Example battery pack chargers may include mechanisms for determining the characteristics of a battery pack to be charged and charging the battery pack based on those characteristics. Example battery pack type determination mechanisms include an electrical-characteristic sensor, specific terminal engagement, and/or battery-charger mating components.

In accordance with one embodiment of the invention, a battery charger is provided. The charger may include: a first terminal for connecting to a battery pack; a second terminal for connecting to a battery pack; a microprocessor operatively connected to the terminals and configured to receive a signal from at least one terminal regarding a battery pack connected to the terminal and control the charger to select and apply a charging regime to the battery pack according to the signal.

In accordance with another embodiment of the invention, a method of charging a battery is provided. The method may include: applying a toggle signal to charging terminals; monitoring a terminal voltage at the maximum and minimum of the toggle signal; determining a difference in the terminal voltage at the maximum and minimum of the toggle signal; comparing the difference in terminal voltage to a predetermined threshold, if the difference in terminal voltage is below the predetermined threshold, then; detecting a type of battery pack connected to the terminals; and applying a charging regime according to the type of battery pack detected.

In accordance with yet another embodiment of the invention, a method of charging a battery is provided. The method may include: electronically connecting a battery pack to a charger; detecting information regarding the battery pack; determining an appropriate charging regime based on the detected information; and applying the charging regime to the battery pack.

Example battery packs chargers may also include features to prevent damage and wear when charging multiple types of battery packs. Example damage-reducing features include voltage decay sensors for determining battery presence.

The above and other features of example embodiments including various and novel details of construction and combinations of parts will now be more particularly described with reference to the accompanying drawings. It will be understood that the details of the example embodiments are shown by way of illustration only and not as limitations of the example embodiments. The principles and features of this invention may be employed in varied and numerous embodiments without departing from the spirit and scope of the invention.

DETAILED DESCRIPTION

Figure 1:
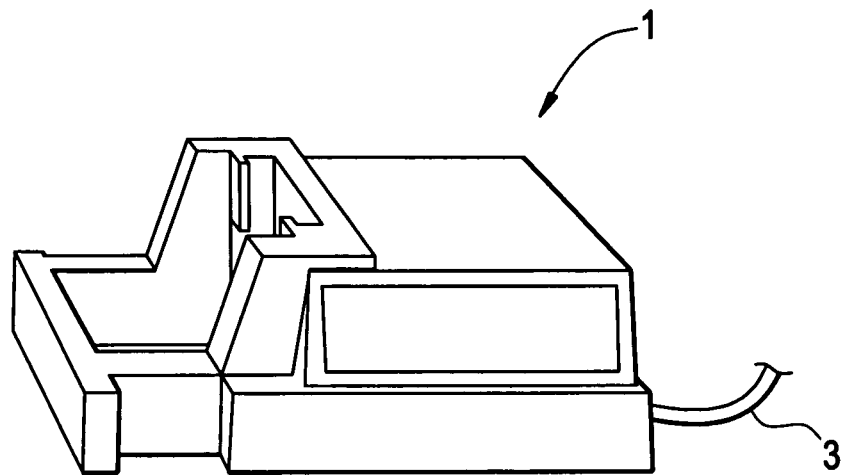
FIGS. 1 and 2 are isometric views of example embodiment battery pack chargers.

The following description presents example embodiments and is not intended to limit the present disclosure, in application or use. It should be understood that throughout the drawings, corresponding reference numerals indicate like or corresponding parts and features.

Figure 2:
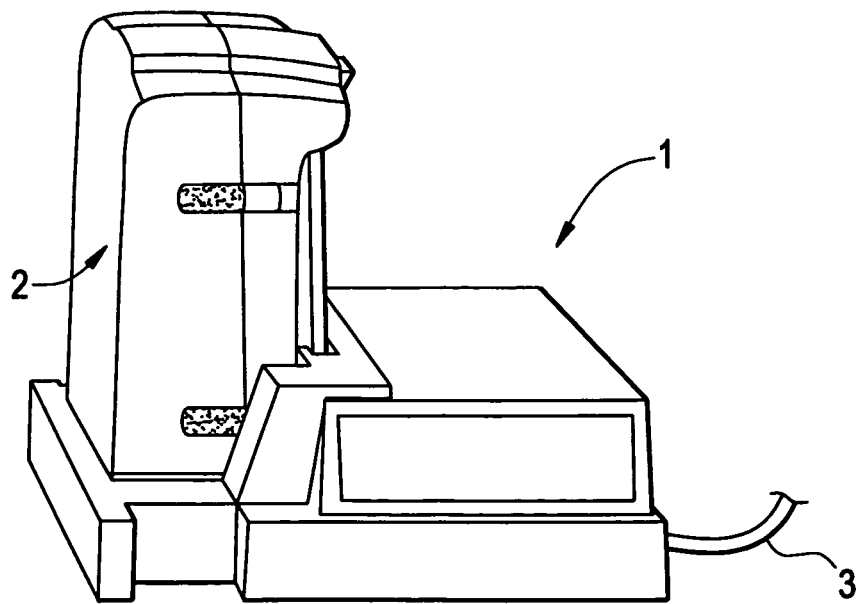

As shown in FIGS. 1 and 2, an example embodiment battery pack charger 1 may be configured to provide power to a battery pack 2 inserted therein or otherwise connected thereto. The charger 1 may include a power source and/or electrical connection 3 to conventional power outlets from which power may be transferred to a battery pack 2.

Multiple types and generations of battery packs 2 may be present at a single location where portable power tools are being used and charged, and multiple chargers 3 may exist for charging the individual tools. Example embodiments described below include features that allow multiple battery types and generations to be charged with a single charger.

I. Example Embodiments Depicted in FIGS. 3-6

Figure 3:
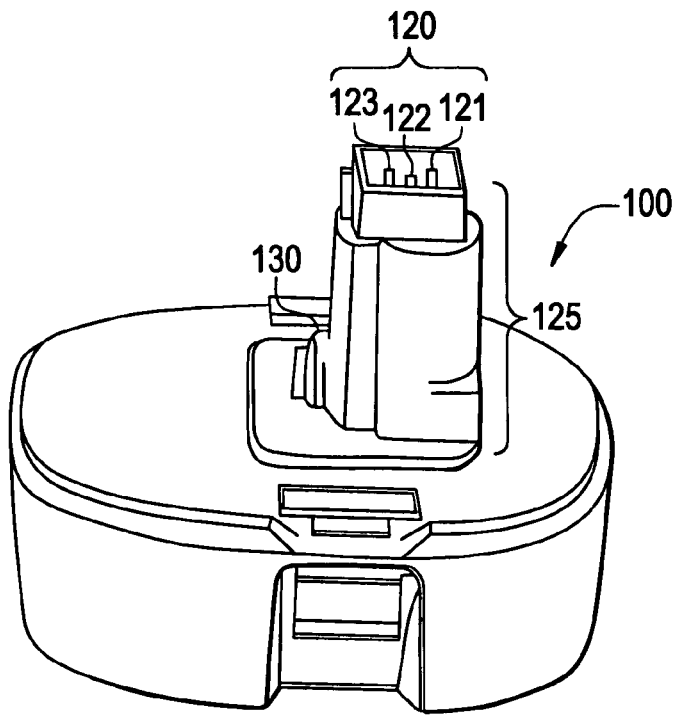
FIG. 3 is an example battery pack using alternate terminals to provide correct battery pack charging.
Figure 4:
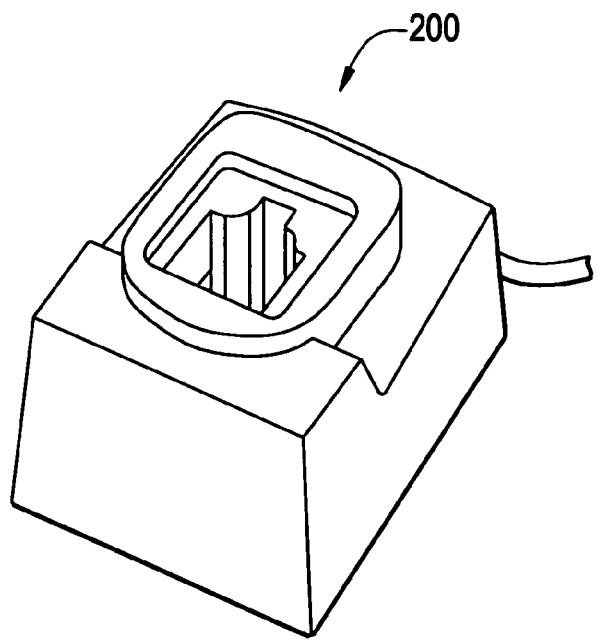
FIG. 4 is an example battery pack charger using alternate terminals to provide correct battery pack charging.
Figure 5:
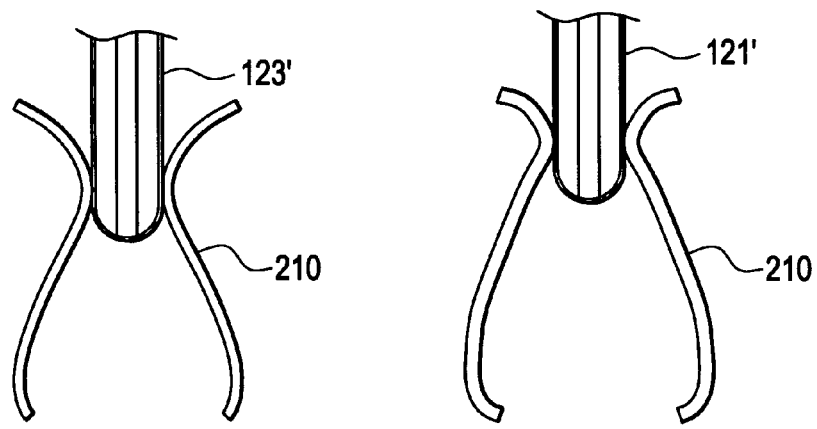
FIG. 5 is a profile view of an example terminal engagement with a first type of battery and example battery pack charger.

FIGS. 3-5 illustrate a tower style example embodiment battery pack and example embodiment charger including battery-type-dependent charging paths. Other style chargers, including rail style chargers, are useable as example embodiments, and tower style batteries and chargers are shown merely as an example of one such configuration.

As shown in FIG. 3, the example tower-style battery 100 includes a number of terminals 120 that electrically connect the battery with example chargers. Terminals may be in a variety of configurations, for example, positive and negative terminals 123 and 121 may provide electrical connection while a grounding terminal 122 grounds the battery electronics, provides data exchange, and/or otherwise connects the battery to the charger.

FIG. 4 shows an example tower-style charger into which the battery pack of FIG. 3 may be inserted for charging. Because example battery packs 100 may have varying chemical properties, charging times, electrical requirements, and/or other physical characteristics, example charger 200 may provide unique charging current, voltage, charging time, and/or other charging characteristics (hereinafter "charging regime") based on the type of battery inserted.

One way for example chargers to determine the proper charging regime for the battery inserted in the charger is to provide different charging paths for different types of batteries. Batteries with different chemistries, for example, Li-Ion batteries and Ni/MH batteries, may have different body shape and/or terminal configuration. An example charger 200 may thus provide different terminals that match only a particular battery type and provide a charging regime matching that type.

As shown in FIG. 3, terminals 120 may be provided at one end of a tower 125 of an example battery 100. The physical orientation of the terminals 120 may be arranged on the battery for creating a connection with the charger based on the particular battery being charged. For example, the terminals 120 may have a particular spacing or position on a defined area of the battery 100, each at one end on the illustrated towers 125, that reflects the battery type that forms a connection between a pack and a charger for a particular battery type.

In particular, the terminals themselves may also be configured for particular battery types. Further, terminals 120 of the example battery 100 may be substantially different than terminals of other battery types requiring different charging regimes. Thus, example batteries can be screened by using a terminal combination that establishes an electrical connection with an appropriate battery.

While a tulip-style terminal arrangement is shown in the example embodiments, other types of terminal configurations may be used that are consistent with the invention.

As shown in FIG. 5, example chargers may discriminate among various battery types by possessing sets of charging terminals 210 that will electrically connect with only a particular type of battery. A charging regime provided by terminals 210 may match only the regime required by other batteries that fully engage the terminals as shown in FIG. 5. For example, voltage across terminals 210 may match only to a voltage required by other battery types with terminals fully engaging terminals 210. Other regime matching characteristics, including for example charging time and maximum current, may be provided to only terminals 210.

Figure 6:
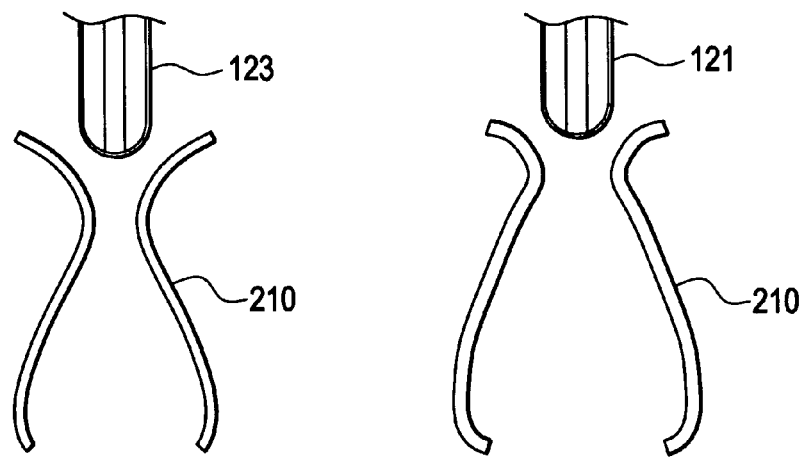
FIG. 6 is a profile view of an example terminal engagement with a second type of battery and the example battery pack charger of FIG. 5.

As shown in FIG. 5, the charger may contain a unique charging terminal such as a tulip style arrangement. The other battery terminals 123' and 121' may connect with the tulip-style charging terminals 210 when the other battery is inserted into the example charger 200. If however, example batteries 100 are inserted into the example charger, instead of fully engaging the charging terminals 210 like other battery types as shown in FIG. 5, positive and negative terminals 121 and 123 may not connect with charging terminals 210 as shown in FIG. 6.

Figure 6A:
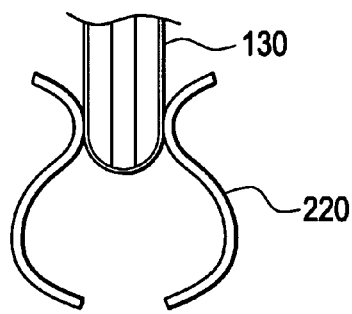
FIG. 6A is a profile view of an example alternative charging terminal engagement with an alternate battery terminal.

FIG. 6A shows an alternate charging terminal 220 in the example charger 200 that may be aligned with and engage alternate battery terminal 130. The alternate charging terminal 220 may provide a different charging regime unique to example batteries 200 with alternate battery terminal 130 that engage alternate terminal 220. Other batteries having terminals 123' and 121' that fully engage terminals 210 may not engage alternate terminal 220 in example chargers and thus may not be electrically connected to alternate charging terminal 220.

By these different terminals 210 and 220 in the same example charger, different charging regimes may be provided to different types of batteries, based on which terminals the battery contacts. Thus batteries, even having a substantially similar overall shape, with different terminal configurations may be charged differently in the same example charger 200, based on the terminal shape and configuration.

For example, a Li-Ion battery may have shorter terminals than a Ni-Cad battery and an additional post terminal, but the two batteries may have substantially similar shape and be useable in the same tool. Example chargers may thus engage the Ni-Cad battery through a first set of terminals and determine charge completion based on typical Ni-Cad voltage variations at charge completion. A Li-Ion battery may be inserted in the same charger yet engage a different set of terminals and be charged in a different manner. Thus, Li-Ion batteries, with charging requirements vastly different than Ni-Cad batteries, may be successfully charged in the same example charger without damaging the battery.

II. Example Embodiments Depicted in FIGS. 7-8

Other example chargers may include co-located terminals that provide alternate charging paths based on battery terminal length alone, without relying on additional or alternately-located terminals.

Figure 7:
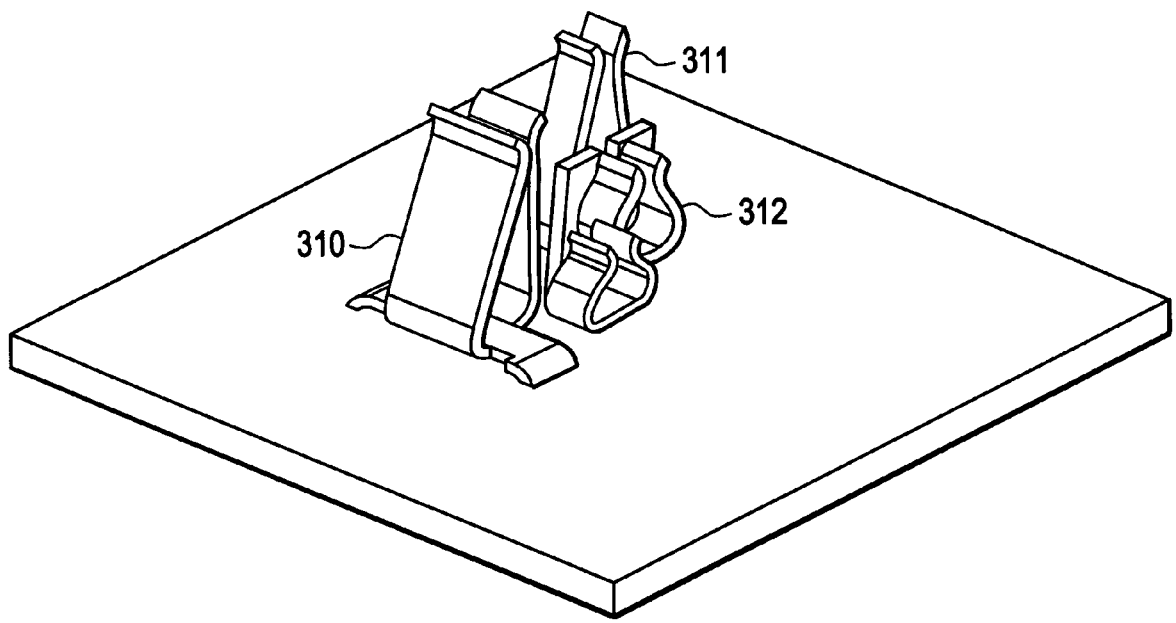
FIG. 7 is an isometric view of an example dual terminal engagement for utilizing alternate terminals.
Figure 8:
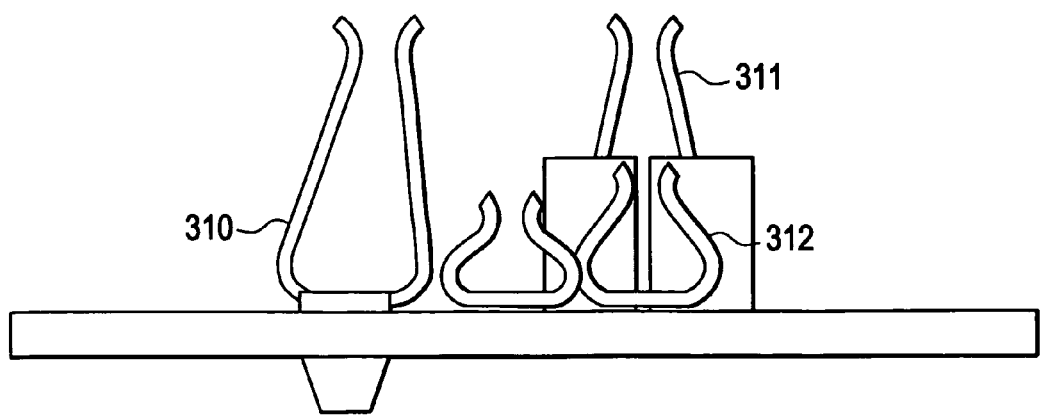
FIG. 8 is a profile view of the example terminals of FIG. 7.

As shown in FIGS. 7 and 8, co-located terminals 311 and 312 may provide alternate charging paths based on the length of the battery terminal inserted in those terminals. Negative terminal 310 may function as a shared negative terminal for all batteries inserted in example chargers. Positive first terminal 311 may have a length configured to engage types of tool terminals, and positive second terminal 312 may engage only subsets of those types of tool terminals. That is, shorter second terminals 312 may engage only tools with longer terminals, while terminals 311 may engage tools with both longer and shorter terminals.

Because co-located positive terminals 311 and 312 engage, in combination, different types of tool terminals, terminals 311 and 312 may provide different charging regimes and thus differently charge tools depending on terminal length. For example, if a tool having terminals 123' and 121' as shown in FIG. 5 is inserted into example terminals 311 and 312 in FIGS. 7 and 8, both positive terminals 311 and 312 may engage the tool terminal. Alternatively, if a tool having terminals 123 and 121 as shown in FIG. 6 is inserted, only longer positive terminal 311 may engage the tool terminal.

Longer and shorter co-located terminals 311 and 312 may provide different charging regimes, and thus, different types of charge may be delivered to tools based on their terminal length. As previously stated, charging regimes may include voltage characteristics, maximum current, charging time, resistance detection, charge completion detection, and/or any other charging characteristics of individual battery packs. If both terminals 311 and 312 are engaged by a long battery terminal (such as 121' in FIG. 5), both terminals may provide charging such that their combined charging provides a different charging regime to the long terminal battery. Alternately, example chargers may possess logical or other known circuitry to allow only a single terminal of 311 and 312 to deliver an alternate charging regime if both terminals 311 and 312 are engaged.

For example, only long positive terminal 311 may engage Li-Ion batteries, because these types of batteries have shorter terminals than NiCad or NiMH batteries. When only the long positive terminal 311 is engaged, that terminal provides electric current, voltage, and other charge characteristics required by only Li-Ion batteries. Short terminal 312 may be engaged only to NiCad or NiMH batteries. Thus, if both terminals 311 and 312 are engaged, they provide, together or individually, charge characteristics required by only NiCad or NiMH battery packs.

Several variations of the above example configurations are possible while still achieving the same structural discrimination in example chargers. For example, any number of alternate terminal locations may be used to uniquely engage and charge any number of batteries, each having a distinct charging requirement and terminal configuration. Or, for example, some terminals may be shared among all battery types, with non-shared terminals determining charge regime. For example, a common negative power terminal may be in example chargers and accessible to all connected batteries, while different positive terminals with alternate charging regimes may be accessible only to particular batteries matching the positive terminal's charging characteristics.

Similarly, any number of known variations may be used to achieve alternate terminal engagement between different types of batteries. For example, an example charger may have different shaped openings or blocking parts that enable one type of battery to engage one set of terminals but prevent other types of batteries with other shapes from engaging the same terminals. Further, any number of known terminal shapes and charging regimes may be used to successfully electrically connect example chargers to example batteries.

III. Example Embodiment Depicted in FIGS. 9-10

A second example charger mechanism for determining battery pack configuration and applying a matching charging regime may include determining electrical properties of an inserted battery by measuring electrical properties of the inserted battery. These example structures may be useable with a universal terminal engaged by all battery types, or with alternate terminals disclosed in previous example embodiments.

Example batteries may include a non-charging terminal that provides battery information that may be read by example chargers. For example, terminal 122 in FIG. 3 may be a non-charging terminal capable of providing battery-type information. From these structures example chargers may discriminate among different battery types and provide proper charging regimes to the inserted batteries.

Figure 9:
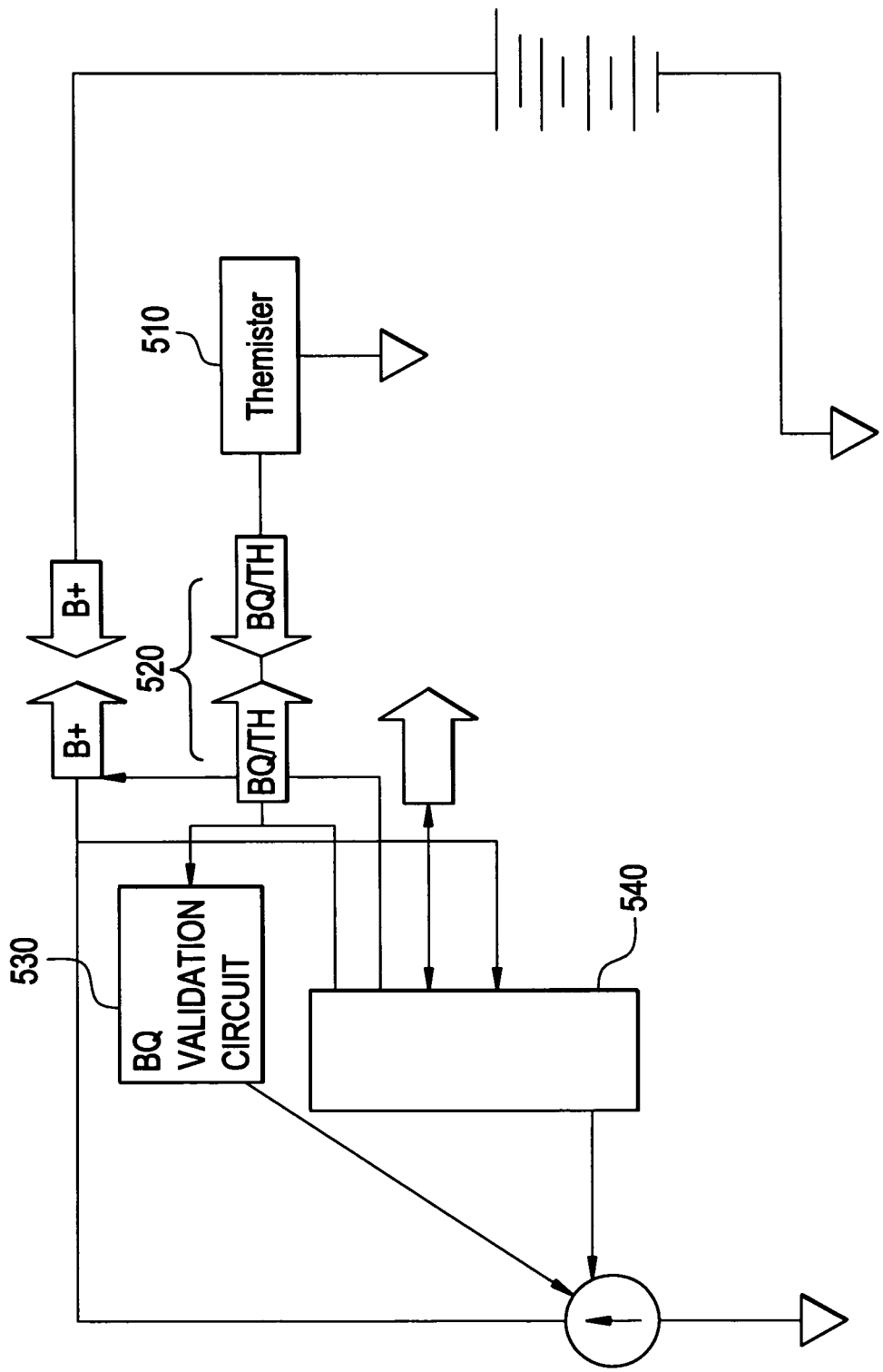
FIG. 9 is a plan view of example circuitry for determining proper charging based on battery data.

As shown in FIG. 9, one example mechanism for providing battery information may involve a thermistor and/or resistor 510 electrically connected to a non-charging terminal in the battery. Example resistors 510 provide a voltage range for a given current that is unique to the battery type. Example battery pack chargers may electrically connect with resistors 510 through connections 520, and the voltage may be read by a validation circuit 530. Based on this reading, a microprocessor 540 may enable circuitry corresponding to a proper charging regime for batteries having the measured voltage range. If no voltage or an unidentified voltage range is measured, the microprocessor may discontinue charging as a safety mechanism.

Figure 10:
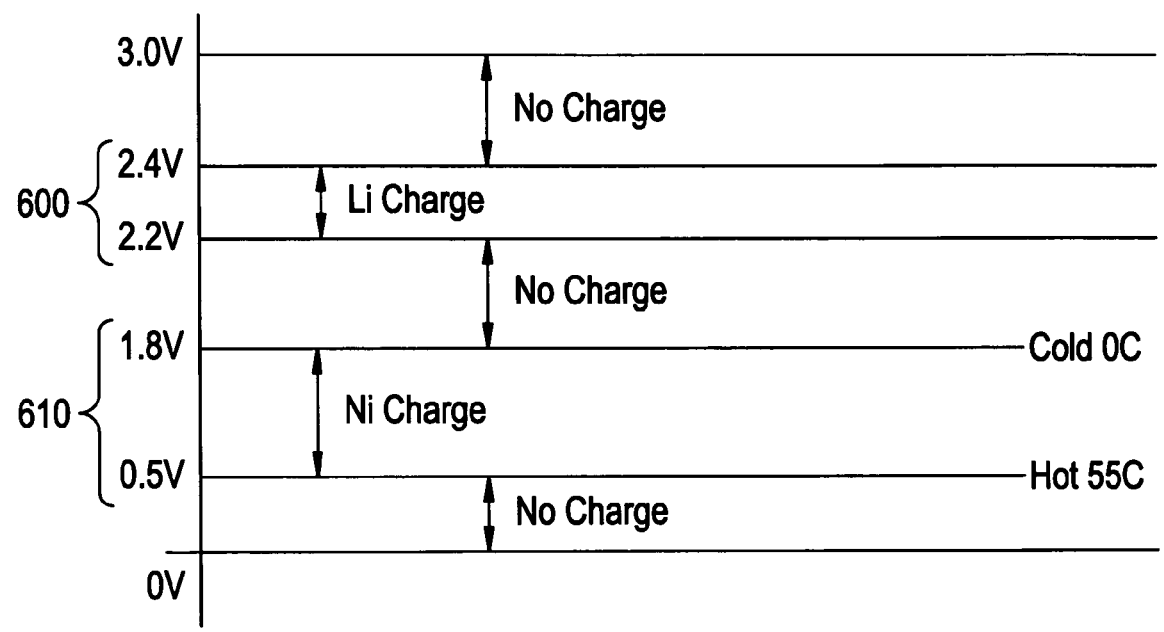
FIG. 10 is a chart illustrating example types of voltage ranges corresponding to different charging regimes.

Through the example circuitry described in FIG. 9, different charging regimes may be associated with particular resistances of known battery types. For example, as shown in FIG. 10, a first resistance may be associated with Li-Ion batteries that will generate a known first voltage range 600 in example chargers electrically connected to non-charging terminals of the battery. Once example chargers detect the first voltage range 600, a charging scheme corresponding to Li-Ion batteries is provided by the charger. A second resistance may be associated with NiCad batteries that will generate a known second voltage range 610 in the same example chargers. When example chargers detect the second voltage range 610, a charging scheme corresponding to NiCad batteries is provided by the charger.

Although example embodiments in FIGS. 9-10 have been described with regard to a characteristic resistance being associated with particular batteries and charging regimes, several other characteristics and measurements may be used to identify battery type in example chargers. For example, a non-charging terminal may provide digital signals that are readable by an example charger microprocessor. The digital data may include a battery type that is readable by the microprocessor and used to determine a proper charging regime. Known analog signals, voltages, currents, and/or any other type of data transmission may be used to convey battery type to example chargers and allow the charger to select a proper charging regime including, for example, maximum current, charge time, charge completion indications, current and voltage variations, and/or any other charging characteristic.

IV. Example Embodiment Depicted in FIG. 11

Figure 11:
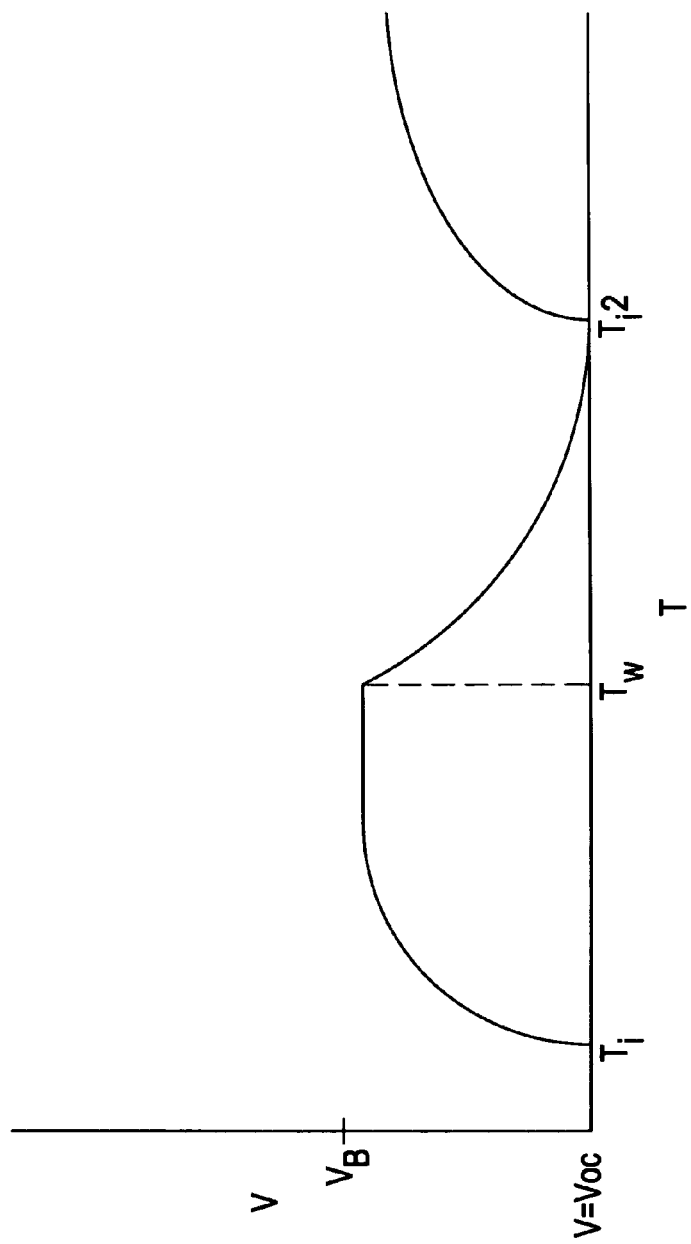
FIG. 11 is a graph of example voltage ranges and voltage decay waveforms in example chargers.

Example embodiments may further provide circuitry and charging methods for preventing damage to example battery chargers having low or no open circuit voltage. Example chargers may have no open circuit voltage; that is, the voltage potential when no battery pack is inserted is near zero between the charging terminals. As shown in FIG. 11, $V_{OC}$ (open circuit voltage) may be zero volts, whereas the voltage of battery terminals may be measurably higher ($V_B$). By use of a conventional voltage measuring device, example chargers may begin charging only when a non-zero voltage potential is detected between charging terminals. For example, example chargers may begin charging shortly after time $T_i$ when voltage increases and indicates battery insertion.

As also shown in FIG. 11, however, example chargers may not jump between $V_{OC}$ and $V_B$ as a step-function; rather, the voltage transition is a continuous exponential due to the presence of capacitors in example batteries and chargers. Thus, when the battery is withdrawn at time $T_W$, the voltage potential does not immediately near zero or $V_{OC}$. If example chargers activate at any voltage above $V_{OC}$, then example chargers may continue to deliver power after a battery is removed at $T_W$, which may damage components of example chargers.

In order to prevent stressing components of example chargers, example chargers may include a further voltage detection mechanism, such as a microprocessor or voltage microcontroller, that senses voltage decrease instead of voltage at $V_{OC}$. Charging may be terminated by the microcontroller when voltage first starts to decrease, shortly after $T_W$, instead of near $T_{i2}$, which may be much later than $T_W$.

For example, if a battery pack is charging in an example charger and voltage across the charging terminals is $V_B$, then example chargers may continue delivering charging power while the voltage remains at $V_B$. When the battery pack is removed at $T_W$, voltage immediately begins decaying, and example chargers sense this decay and terminate the charging power. Thus example chargers may cease delivering charging power well before terminal voltage reaches near zero and before battery components are damaged.

V. Example Embodiment Depicted in FIGS. 12-13

As discussed above in earlier example embodiments, example chargers may have no open circuit voltage; that is, the voltage potential when no battery pack is inserted may be near zero between the charging terminals.

Some battery types may have near-zero terminal voltage after fully discharging. For example, a Ni-Cad battery may have a very low voltage across its terminals after completely discharging, or a Lithium Ion battery may have a very low voltage across its terminals if damaged or in an inoperative state. Because of low terminal voltage in both discharged battery packs and example chargers, battery presence and charge regime determination may require another mechanism to determine low-voltage battery presence.

Example chargers may include circuitry and associated charging methods that determine battery presence even if an inserted battery pack has low or no terminal voltage.

Figure 12:
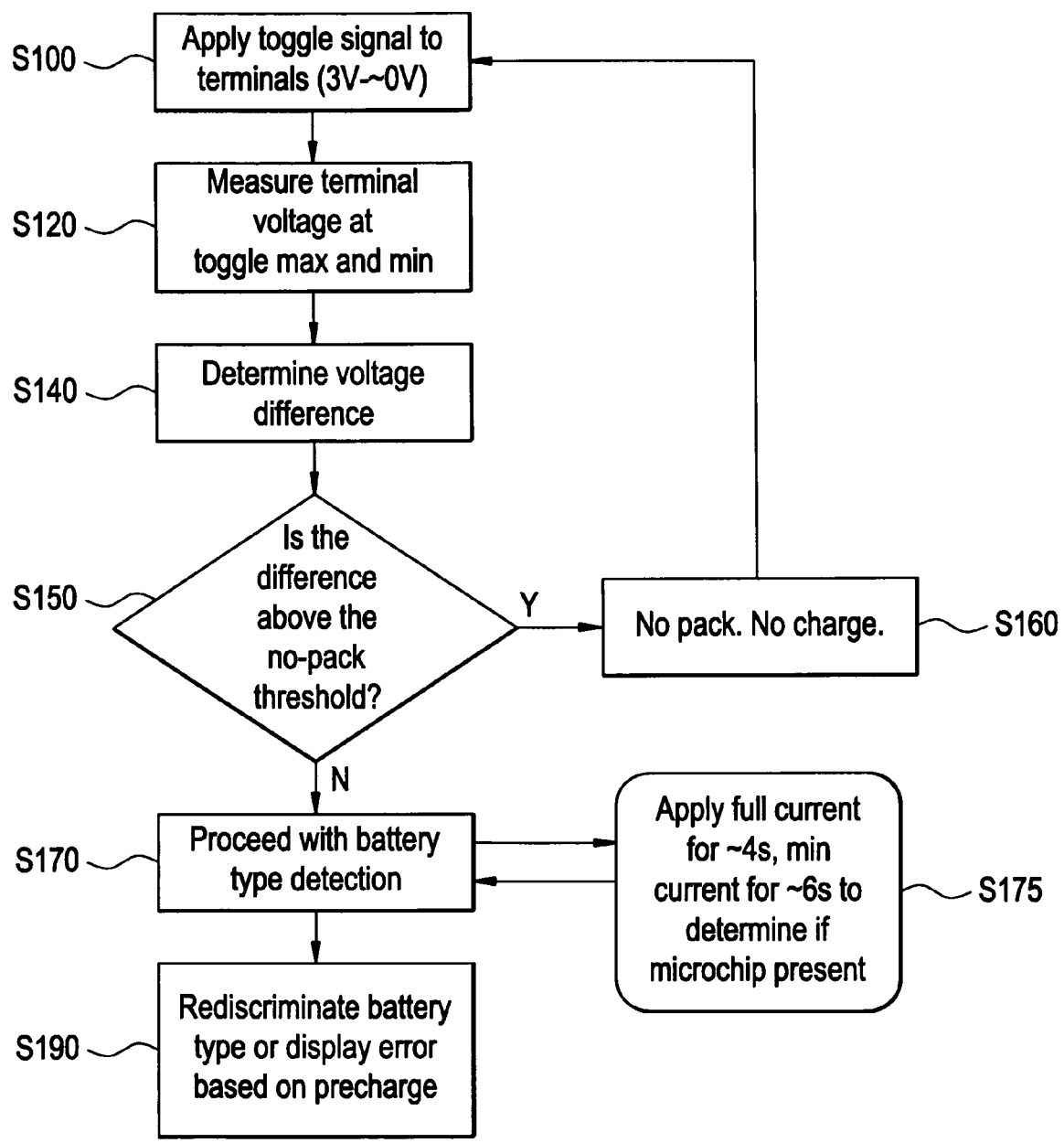
FIG. 12 is a flow chart of an example method for charging battery packs.

As shown in FIG. 12, example chargers may perform an example method in order to determine battery presence. Example methods include applying a toggle signal across the charger terminals at step S100. The toggle signal may be a voltage or current pulse of any magnitude sufficient to create an electrical response in potentially-inserted battery packs without damaging those packs.

Figure 13:
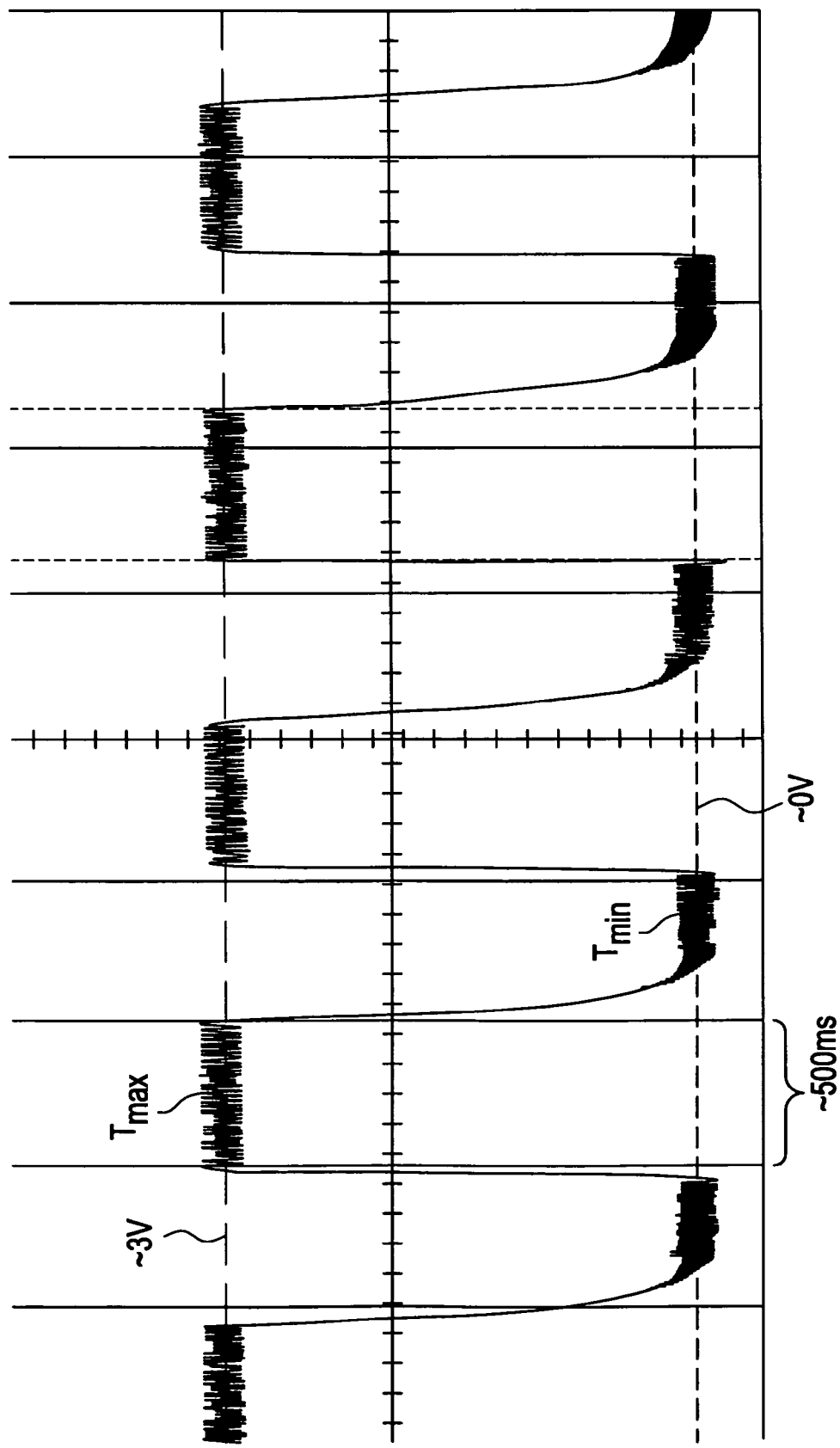
FIG. 13 is an example waveform useable with example methods.

For example, as shown in FIG. 13, the toggle signal may be a square voltage pulse. The example pulse shown in FIG. 13 has a maximum voltage of about 3 Volts and a minimum voltage of about 0 Volts. The example pulse in FIG. 13 is applied for about 0.5 seconds and then no voltage is applied for about 0.5 such that the entire toggle signal cycles every second. The pulse used in example methods need not be square as shown in FIG. 13, but may be a variety of waveforms, including sawtooth and/or multi-stepped, depending on the types of batteries to be identified.

As shown in FIGS. 12 and 13, after applying the toggle signal at S100, the battery pack charger measures the terminal voltage at the signal maximum and minimum at step S120. For example, as shown in FIG. 13, the charger may measure the terminal voltage at Tmax and Tmin in order to measure the voltage at the signal maximum and minimum. If other pulse forms are used in example methods, other measuring times may be used in order to measure the signal maximum and minimum.

Example chargers may then determine the voltage difference across the terminals at Tmax and Tmin in step S140. This difference may then be compared against a no-pack threshold in step S150. The no-pack threshold may be, for example, a threshold corresponding to the voltage difference across the terminals when only air or a different non-battery material is between the terminals while a voltage pulse is applied from the charger across the charger terminals. Such a threshold will generally be much higher compared to voltage measured when a conductor or battery is connected between the terminals, due to the differing resistance. The threshold may be compared through any method known in the art, including analog circuitry or digitally through a microprocessor in example batteries.

If the voltage difference determined in step S140 is above the no-pack threshold compared in step S150, the charger may determine that no battery is present in step S160 and continue to apply to toggle signal until a battery is detected. That is, steps S100, S120, S140, S150, and S160 may be repeated as long as the measured voltage is above the threshold, and thus, no battery is detected.

If the voltage difference is below the no-pack voltage threshold, then example chargers may determine that a battery pack is present. Example methods may then include proceeding with battery pack type detection in step S170. The battery pack type detection may be performed by any example embodiment previously discussed; that is, example embodiment charger structures for discriminating based on pack type may be used in step S170. For example, differing terminal placement, characteristic battery resistance, and/or Hall sensor presence may be determined in step 170. Based on these determinations, the battery pack may be charged or pre-charged in step S190 based on their type.

Additionally, the charger may display an error message based on the results of step 150 and step S170 in step S190. For example, if other battery type detection mechanisms determine that the battery is a Lithium-Ion battery, but there is initially no voltage across the Li-Ion terminals, the charger may display an error message because correctly functioning Li-Ion chemistries may not have zero-voltage states.

In addition to the previously described structures and methods for determining pack type, step S175 illustrates another method for determining pack type in a low-voltage situation. Once the charger has proceeded through step S150 to determine that a pack is present but in a low-voltage state, the example chargers may apply a longer charging current to the battery in step S175. This precharge may be of lesser duration and/or magnitude than a full charge for specific pack types, but may be sufficient to power electronics within an inserted battery. For example, example chargers may apply full charging current to the battery for about 4 seconds and then stop for 6 seconds while determining a response from the battery.

Batteries may include, for example, microchips communicatively connected to example chargers. Such microchips may not be able to communicate with example chargers while in a low-voltage situation, and the precharge in step S175 may power those microchips such that the charger may determine the type of battery based on characteristics of the microchip. By the step S175, example chargers may thus determine pack type and appropriate charging regime in packs in a low-voltage state before actual charging commences.

Once the battery pack has been determined in steps S170 and/or S175, example chargers may apply an appropriate charge, precharge, or error message based on the results of the battery type detection and the voltage state of the battery. For example, some types of batteries may be capable of being charged normally while in a low-voltage state, while other batteries may have special precharging regimes applicable to a low voltage state. The example method shown in FIG. 12 allows example chargers to so discriminate and apply appropriate charge regimes to batteries in a low-voltage condition.

Each of the aforementioned embodiments may be used alone and in combination for allowing battery packs having different charging characteristics and requirements to be charged using the same example charger.

What is claimed is:

1. A method of charging a battery including:
   applying a toggle signal to charging terminals;
   monitoring a terminal voltage at the maximum and minimum of the toggle signal;
   determining a difference in the terminal voltage at the maximum and minimum of the toggle signal;
   comparing the difference in terminal voltage to a predetermined threshold, and if the difference in terminal voltage is below the predetermined threshold, then;
   detecting a type of battery pack connected to the terminals; and
   applying a charging regime according to the type of battery pack detected.

2. The method of claim 1, further comprising repeating the applying, monitoring, determining, and comparing steps when the terminal voltage is above the predetermined threshold until the difference in the terminal voltage is below the predetermined threshold.

3. The method of claim 1, wherein the detecting step includes applying a current to the terminals and then stopping applying the current to the terminals and processing a signal from the battery pack to determine whether the battery pack has a microchip.

4. The method of claim 3, wherein the current is applied for about 4 seconds and then stopped for about 6 seconds.

5. The method of claim 1, further comprising displaying an error message when it is not appropriate to charge the battery pack.

6. The method of claim 1, further comprising determining a condition of the battery pack and changing the charge regime applied to the battery pack as a condition of the battery pack changes.

7. The method of claim 1, wherein the toggle signal has a maximum of about 3 volts between terminals and a minimum of about 0 volts between terminals and cycles about one time per second.

\* \* \* \* \*